Figure 1:
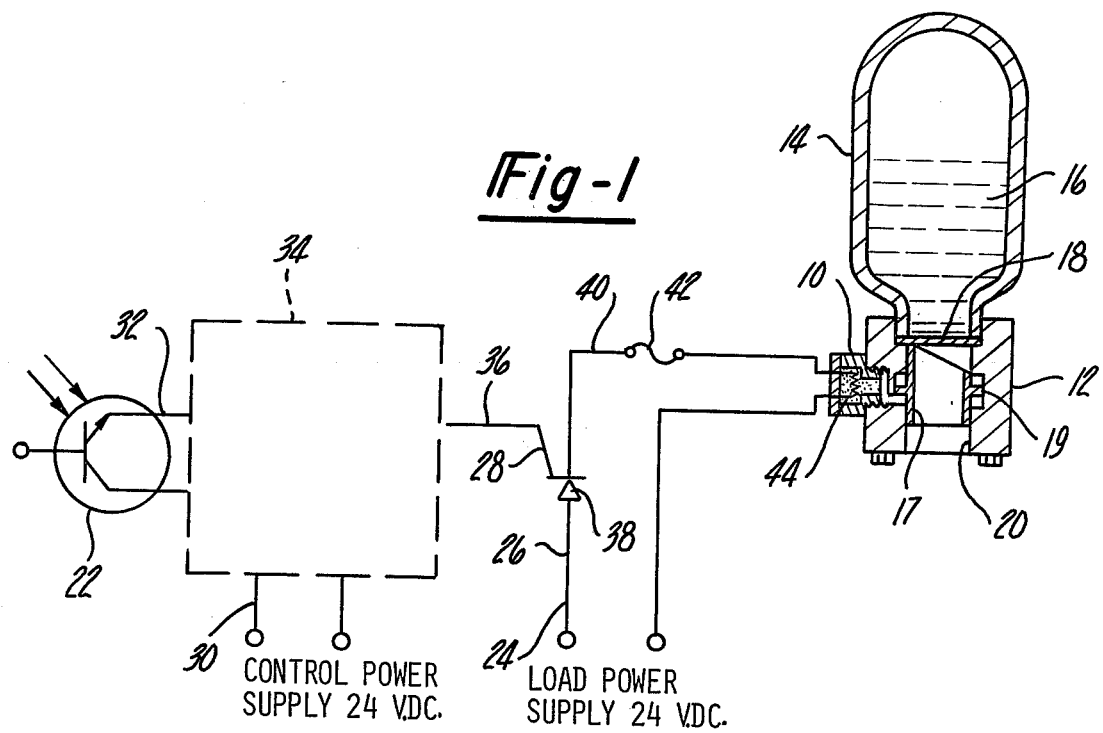

United States Patent [19]

Arutunian et al.

[11] 4,110,812

[45] Aug. 29, 1978

[54] NON-RECURRENT PULSE GENERATOR

[75] Inventors: Gregory Arutunian, Detroit; Anthony J. Monte, Utica, both of Mich.

[73] Assignee: The United States of America as represented by the Secretary of the Army, Washington, D.C.

[21] Appl. No.: 723,837

[22] Filed: Sep. 16, 1976

[51] Int. Cl.² .................................................. A62C 35/08
[52] U.S. Cl. ............................ 361/248; 102/203; 169/62; 102/276
[58] Field of Search .................. 361/248, 249, 250, 251, 361/104; 102/70.2 R; 340/250, 215, 216, 227 R; 250/554; 169/62

[56] References Cited

U.S. PATENT DOCUMENTS

| | | | |
|---|---|---|---|
| 2,832,265 | 4/1958 | Reid et al. | 361/250 |
| 3,475,653 | 10/1969 | Odenberg et al. | 361/104 |
| 3,598,055 | 8/1971 | Gunderson | 102/70.2 R |
| 3,722,416 | 3/1973 | Lunt et al. | 102/70.2 R |
| 3,745,546 | 7/1973 | Struger et al. | 340/250 |
| 3,915,237 | 10/1975 | Rozniecki | 169/62 |
| 3,967,255 | 6/1976 | Oliver et al. | 340/227 R |
| 4,034,297 | 7/1977 | Giorgi et al. | 340/250 |

*Primary Examiner*—J. V. Truhe
*Assistant Examiner*—Clifford C. Shaw
*Attorney, Agent, or Firm*—Peter A. Taucher; John E. McRae; Nathan Edelberg

[57] ABSTRACT

A load power supply is connected to the load device through a gated switch and time-delay fuse. The maximum current pulse delivered by the power supply is limited by the "delayed blow" characteristics of the fuse inserted in the circuit. After a selected current-time duration is delivered to the load, the fuse "blows" (opens) and the circuit is effectively de-energized.

1 Claim, 6 Drawing Figures

TIME - CURRENT CHARACTERISTICS OF A PYROTECHNIC - OPERATED SQUIB VALVE

TIME - CURRENT CHARACTERISTICS OF A FAST ACTING FUSE

CURRENT - TIME CHARACTERISTICS OF A SOLENOID VALVE

TIME - CURRENT CHARACTERISTICS OF A FAST ACTING FUSE FOR SOLENOID VALVE APPLICATION

NON-RECURRENT PULSE GENERATOR

The invention described herein may be manufactured, used, and licensed by or for the Government for governmental purposes without payment to us of any royalty thereon.

BACKGROUND AND SUMMARY OF THE INVENTION

The invention relates to simple low cost mechanism for generating a non-recurrent electrical pulse of high power and modest precision. The invention may find application in situations such as fire extinguisher discharge actuation, automotive safety air bags, weapon firing, or explosive detonation systems where it is desired to quickly generate a high amperage pulse for a short time interval.

The electrical circuitry of this invention comprises a gated switch connected to the load device (e.g. Hot wire ignitor or solenoid coil) through a time delay fuse. The time-current or "blow time" curve for the fuse determines the duration of the electrical pulse delivered to the load device.

IN THE DRAWINGS

Figure 4:
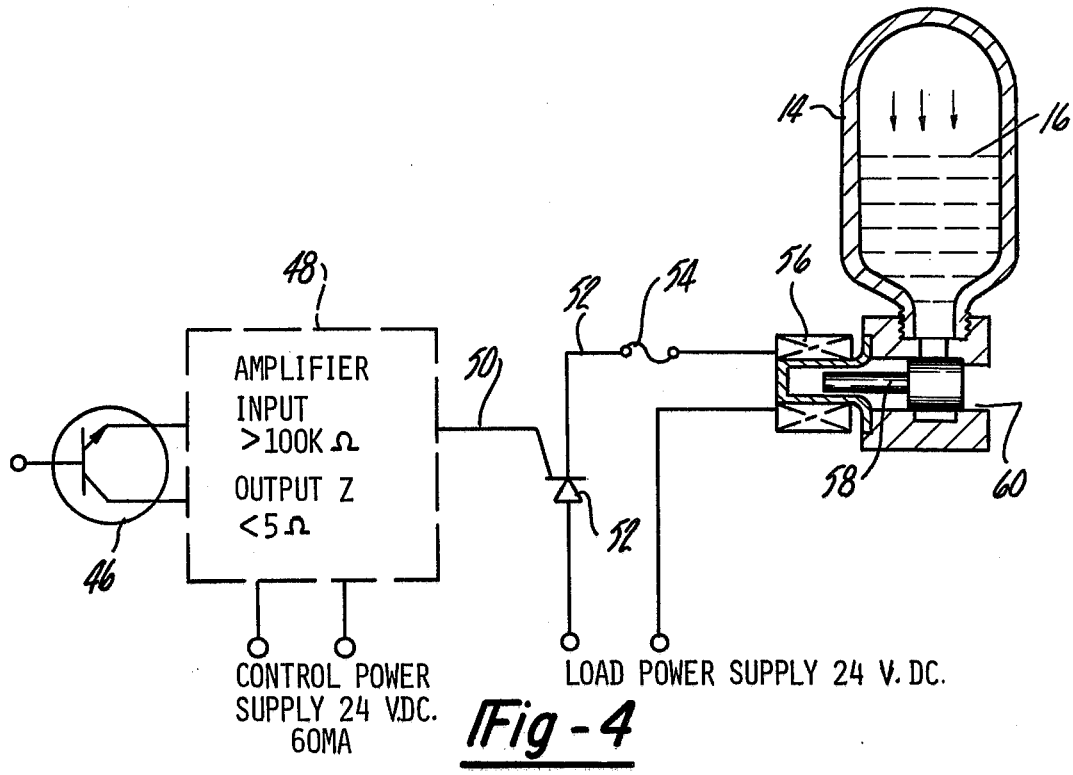

FIG. 1 and FIG. 4 schematically illustrate electrical squib and solenoid circuitry using this invention.

FIGS. 2, 3, 5 and 6 are graphs showing current changes produced during operation of the squib and solenoid-operated valves.

A specific circuit shown in FIG. 1 is used to activate the pyro-technic device 10 of valve 12 that is mechanically connected to a thick-walled bottle 14 containing pressurized fire-suppressant 16, as described in greater detail in U.S. Pat. No. 3,915,237 issued to Edward Rozniecki on Oct. 28, 1975. Electrical energization of the pyro-technic device activates a cutting tool 17 which opens a squib valve by shearing a metallic seal assembly 18, thus permitting pressurized fire suppressant material to be sprayed from the bottle through port 20 to a fireball zone.

Explosive fuel fires must be suppressed within less than 100 milliseconds after detection in order to prevent the generation of toxic products resulting from the thermal decomposition of the Halon 1301 (trade name) suppressant material. The circuit shown in FIG. 1 is designed to provide minimum time delay between initial sensing of a flame by detector 22 and the opening of the squib valve 20.

Figure 2:
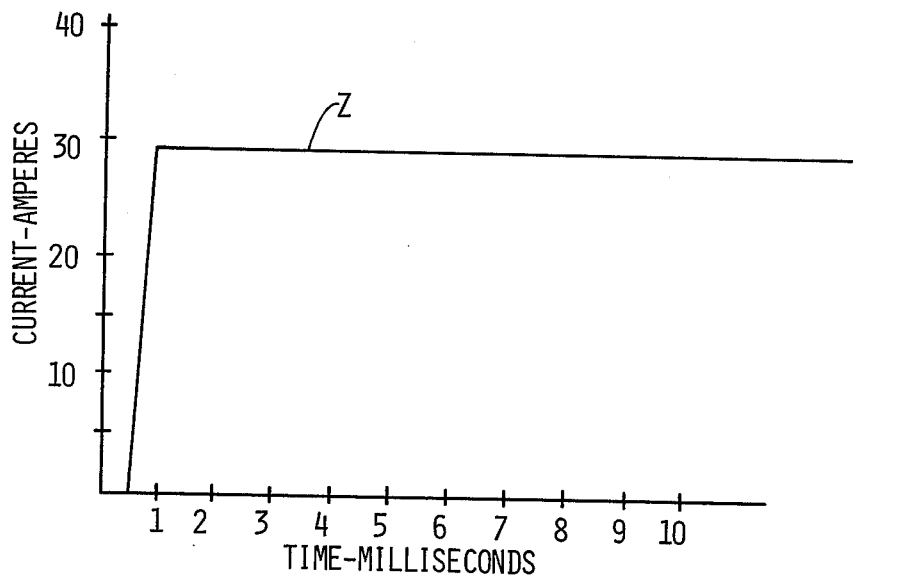

The circuit shown in FIG. 1 comprises a load power supply 24 for delivering high amperage current through line 26 to a silicon controlled rectifier (or a power transistor) having a gate 28 that is triggered by a relatively small current supplied from control power source 30. Source 30 is connected to a flame responsive detector 22 that delivers a very low amperage signal through line 32 to an amplifier 34. The amplified signal is supplied through line 36 to the gate of power switch 38. The semiconductor switch, when triggered, delivers a high amperage current through line 40 and fuse 42, and finally to the resistive heating element 44 of the pyro-technic device. The normal current required for activating the pyro-technic device is approximately 6 amperes; however, due to the decomposition of the explosive compound a layer of electrical conducting carbon is deposited inside the pyro-technic cartridge, thus creating an electrical short circuit. FIG. 2 illustrates the current trace of a pyrotechnic gas generator. After less than 1 millisecond the current increases and remains at a high constant value Z, in most cases up to 30 amperes. This electrical malfunction may not only damage the associated electronic circuitry but also may severely discharge a vehicle battery supply system.

Figure 3:
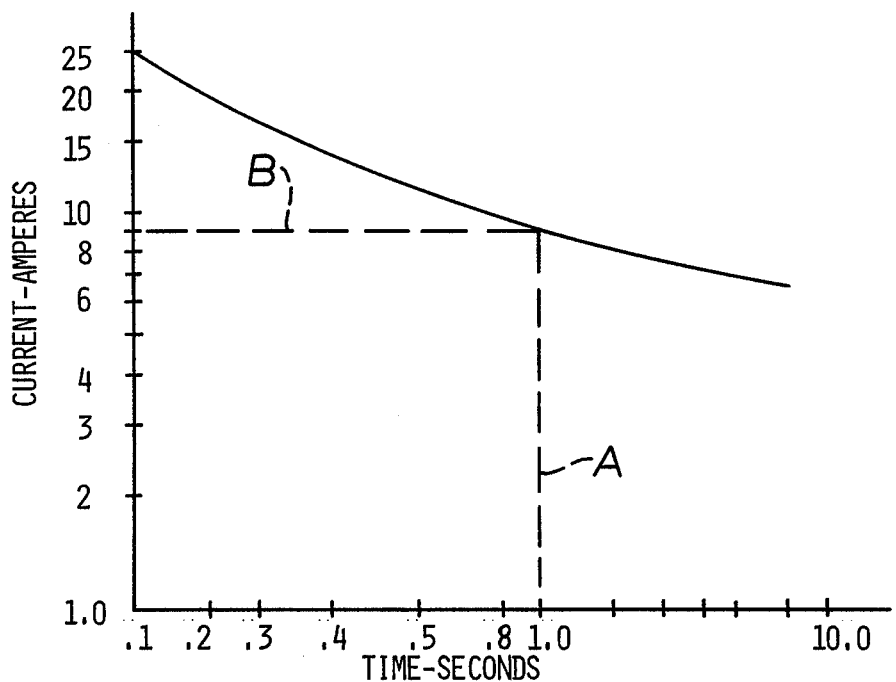

By inserting a fast acting fuse 42 the output current may be disconnected from the spent pyro-technic device, thus preventing damage to electronic amplifiers and excessive current drain of the battery supply. The fuse 42 can be selected from a family of fuses depending upon the current-carrying capability and time duration. FIG. 3 illustrates one possible example where "A" represents the time duration of 1 second of a pulse of current "B" with a load of 9 amperes. The initial current surge in excess of 25 amperes quickly starts the pyro-technic device. The fuse limits the magnitude of the pulse trailing edge and the time-duration of the pulse.

FIG. 4 illustrates another example in the implementation of this invention, which utilizes a solenoid-operated valve discharge of suppressant material when the flame sensor 46 detects a fire. The amplifier 48 provides a triggering pulse through line 50 to the gate of a silicon controlled rectifier 52, which delivers a high current through line 52, fuse 54 and the solenoid coil 56, thereby pulling in the armature 58 to open valve port 60 for discharging suppressant to the fireball zone. By overdriving the solenoid coil with current above its rated capacity, the valve may be fully opened very quickly a few milliseconds after activation by sensor 46.

Figure 5:
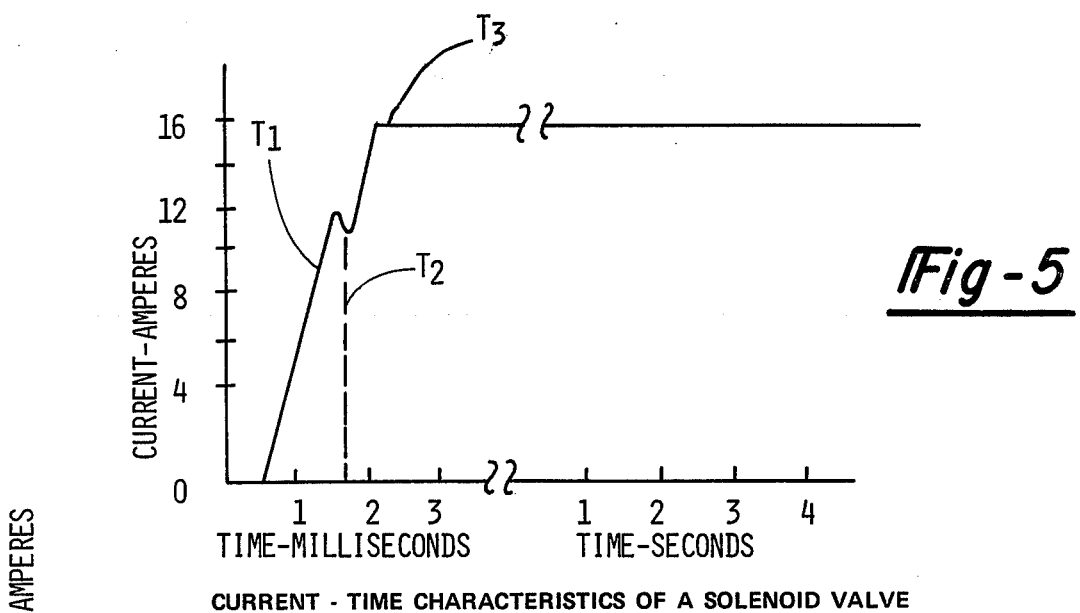

FIG. 5 illustrates an example of a time-current characteristic curve of a solenoid-actuated valve without fuse protection. Shortly after time="0," current applied to the solenoid rises steeply as shown by T1 until the valve becomes fully open at T2 when the armature 56 is fully pulled in. The current through the coil reaches the maximum valve of T3, which is limited by the resistance of the coil.

Figure 6:
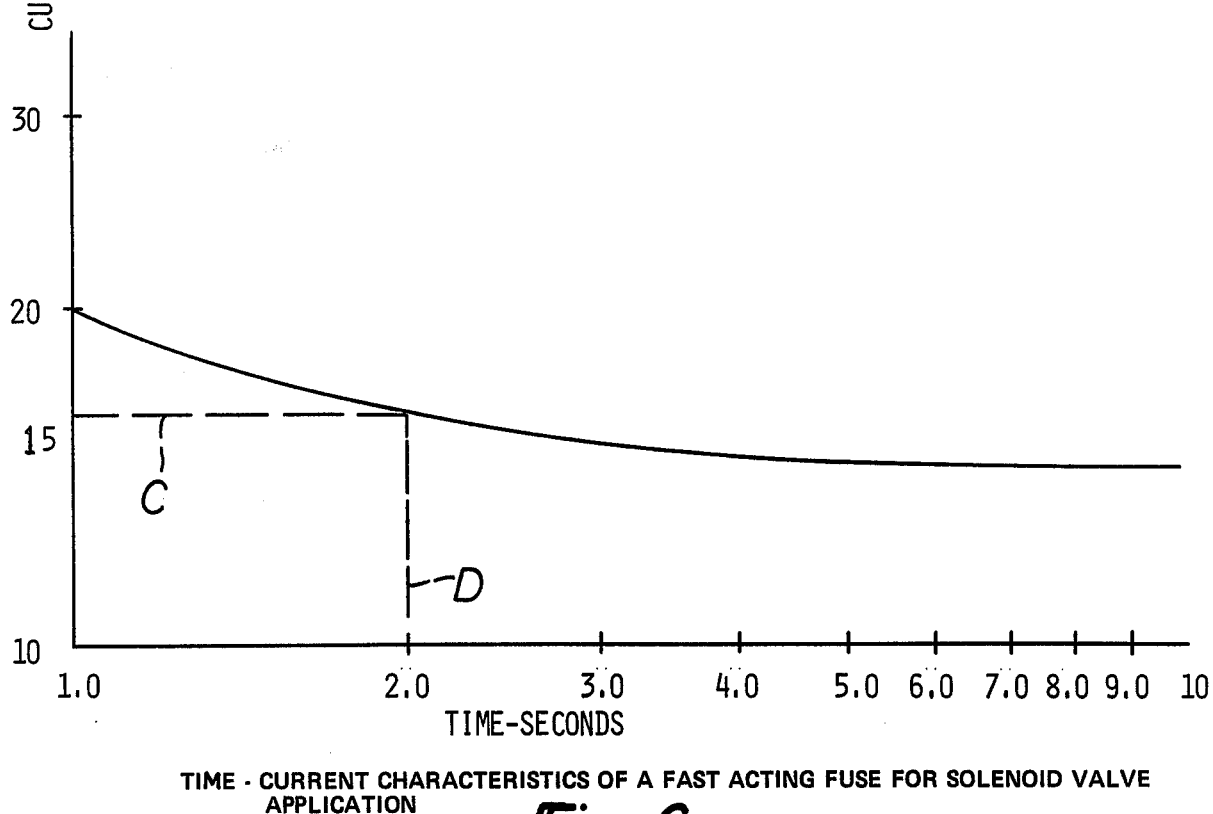

FIG. 6 illustrates a time-current characteristic curve of a solenoid-actuated valve equipped with fuse protection as shown in FIG. 4. Fuse 54 when inserted in the solenoid coil circuit will limit the duration of the steady state current of 16 amperes at "C" for a period of 2 seconds at "D" as shown in FIG. 6 and thus prevent burn-out of the coil. The initial overload driving current in excess of 20 amperes is not able to burn out the coil within this short time interval.

The invention has been described particularly in connection with a fire suppressant system used within a military vehicle. It is believed, however, that the invention could find application in other areas requiring a non-recurrent short duration power pulse having a steeply sloped leading edge and a gradually decaying trailing edge or ceiling. An advantage of the fuse as a control device is its low cost.

We wish it to be understood that we do not desire to be limited to the exact details of construction shown and described for obvious modifications will occur to a person skilled in the art.

We claim:

1. In a fire suppressant system comprising a bottle (14) charged with pressurized suppressant; a valve (18) controlling the discharge of suppressant from the bottle; a pyro-technic explosive squib (10) for operating said valve, said squib including a resistive heating element (44) having an activating current of about 6 amperes; a high amperage load voltage source (24); a gated power switch (38) connected to said voltage source for delivering high amperage current to the aforementioned resistive heating element; a low amperage control voltage source (30) for delivering a control signal to the gate of the aforementioned power switch; and a flame responsive detector switch (22) connected to the control voltage source for initiating the control signal:

the improvement comprising a time delay fuse (42) connected in series with the power switch and resistive heating element for limiting the time interval during which the resistive heating element is subjected to current flows appreciably higher than the aforementioned activating current; said fuse having a time-current decay curve wherein the initial current is in excess of 25 amperes and the current after 1 second is about 9 amperes.

* * * * *